(No Model.)
S. N. SMITH.
PRIMARY BATTERY.
No. 571,460. Patented Nov. 17, 1896.
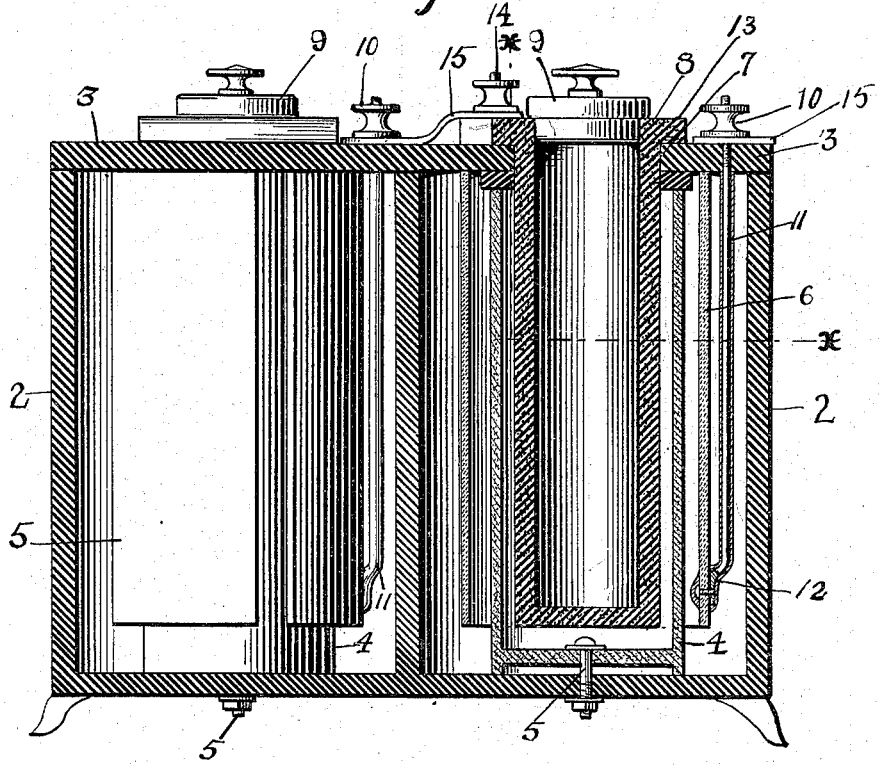
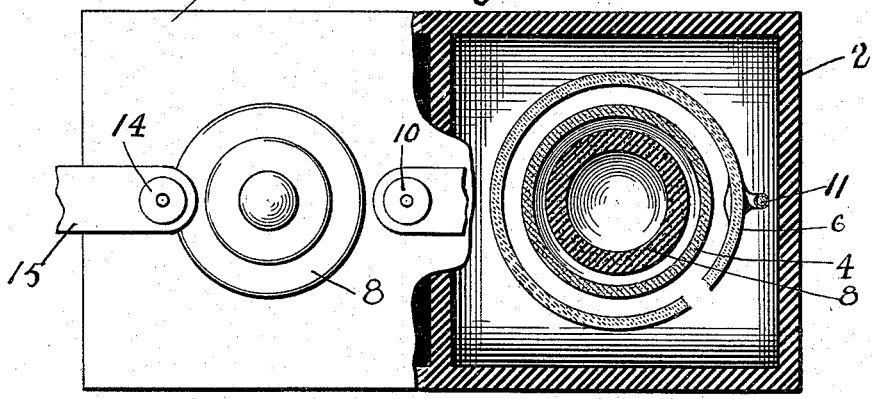
Witnesses:
C. E. Van Dorin.
F. S. Lyon
Inventor;
Samuel N. Smith
By Paul O Hawley
his Att'ys.

UNITED STATES PATENT OFFICE.

SAMUEL N. SMITH, OF MINNEAPOLIS, MINNESOTA.

PRIMARY BATTERY.

SPECIFICATION forming part of Letters Patent No. 571,460, dated November 17, 1896.

Application filed November 16, 1895. Serial No. 569,152. (No model.)

*To all whom it may concern:*

Be it known that I, SAMUEL N. SMITH, of the city of Minneapolis, county of Hennepin, State of Minnesota, have invented certain new and useful Improvements in Primary Batteries, of which the following is a specification.

This invention relates to primary electric batteries; and the object which I have in view is to provide a primary battery of great power and one which with a single charge will furnish power for a period of time ranging from six to twelve hours ordinarily, according to the size of the battery and the demands for power made upon the same, it being a particular object of my invention to furnish a battery to be used in connection with small motors for propelling boats or small machines which are not constantly operated.

A further object of the invention is to provide a battery of a strong and durable construction, and, further, one which may be entirely covered, thereby adapting the battery for purposes where its usage is necessarily rough or where the battery is constantly moved, tilted, or jarred, as when in a boat.

A further object of the invention is to provide a battery which may be charged with common well-known material and which it will be safe to place in the hands of the most inexperienced persons.

With the above objects in view my invention consists in a primary battery comprising a suitable cell, in combination with a porous cup of clay or like material arranged therein, a zinc element arranged in the cell outside of said porous cup, and a porous carbon element provided within said porous cup, said carbon element being in the form of a cup to contain a depolarizing fluid.

My invention consists, further, in the detail construction of battery and in the particular combination of chemicals used in the same.

The invention will be more readily understood by reference to the accompanying drawings, forming part of this specification, and in which—

Figure 1 is a vertical section of two cells of a primary battery embodying my invention, the section of one of the cells being complete upon a central vertical plane. Fig. 2 is a plan view of the two cells with one of the cells in horizontal section on the line $x\,x$ of Fig. 1.

The cells 2 or containing cups or receptacles are tight boxes or jars of wood, fiber, hard rubber, or glass or like suitable material, and 3 represents a cover of the same or of similar material as that from which the cell is formed. In each cell I provide a porous cup 4, made of clay or other suitable material and preferably secured in place within the cell by means of a short bolt 5, fastened in the bottom of the cell, and in the bottom of the porous cup, between the porous cup and the walls of the cell 2, is the zinc element 6 in the form of an incomplete cylinder, and the same is secured to the cover 3 to be lifted off with the cover. The cover 3 is provided with the central opening 7 to admit the porous carbon cup 8, which forms the carbon element of the battery. The top of the carbon cup is preferably closed by a convenient lid or cover 9. The space between the top of the porous cup 4 and the lid or cover 3 is filled in any suitable manner, as by the rubber washer shown, to prevent the liquid in the porous cup from slopping into the outer part of the cell or that from the cell flowing into the cup.

I have found that in most, if not all, primary batteries the zinc is inclined to a more rapid waste at its upper end than at the lower end, and, further, that by making electric connection with the zinc at the lower end thereof this tendency may be obviated, so that the falling away of the zinc is equalized throughout its surface. Hence the electrode or connection 10 is extended in the insulated wire 11 to the lower end of the zinc 4, where the connection 12 is thoroughly insulated from the surrounding liquid to prevent corrosion.

The flange 13 upon the upper end of the carbon cup carries a binding-post 14, from which the thin strip of metal 15 extends to the binding-post 10. This is the arrangement between the cells of large batteries.

In connection with the battery I employ a solution of chlorid of sodium, which practically fills the space around the porous cup 4, the space between the cup 4 and the carbon element being originally filled with clear water, while within the carbon cup I employ a fluid formed by the mixture of a solution of nitrate of soda in diluted sulfuric acid. The acid employed is formed by three parts of acid and one to three parts of water, which is allowed to cool thoroughly before being used. With this I employ the nitrate of soda in the proportion of eight to ten ounces to about one pound of the acid.

When the battery is not in use, it is preferable to remove the cover with the zincs and carbon cups.

Having thus described my invention, I claim as new and desire to secure by Letters Patent—

The combination in an electric primary battery of the cell, with a porous cup of clay fastened in the bottom thereof—a cover tightly fitting the cell—a cylindrical zinc element suspended from said cover into the cell outside of said porous cup, a porous cup of carbon also suspended from said cover and extending into said cup of clay, a washer or packing provided between said cover and the top of said cup of clay electrical connections on said cover with said zinc and carbon parts, said zinc and carbon parts being removable with said cover, a depolarizer comprising acidulated nitrate of soda provided in said carbon cup and a solution of common salt provided in the cell outside said cup of clay substantially as described.

In testimony whereof I have hereunto set my hand this 25th day of September, A. D. 1895.

SAMUEL N. SMITH.

In presence of—
RICHARD PAUL,
A. C. PAUL.